(12) United States Patent
Teng et al.

(10) Patent No.: US 7,978,410 B2
(45) Date of Patent: Jul. 12, 2011

(54) OPTICAL SHEET

(75) Inventors: Tun-Chien Teng, Hsin-Chu (TW);
Jyh-Ming Chen, Hsin-Chu (TW);
Chih-Jen Tsang, Hsin-Chu (TW)

(73) Assignee: Coretronic Corporation, Hsin-chu (TW)

( * ) Notice: Subject to any disclaimer, the term of this patent is extended or adjusted under 35 U.S.C. 154(b) by 0 days.

(21) Appl. No.: 12/645,265

(22) Filed: Dec. 22, 2009

(65) Prior Publication Data
US 2010/0177399 A1 Jul. 15, 2010

(30) Foreign Application Priority Data

Jan. 15, 2009 (TW) ................................ 98101316 A (51) Int. Cl.
*G02B 27/10* (2006.01)
(52) U.S. Cl. ........................................ 359/619; 359/621
(58) Field of Classification Search .................. 359/619, 359/621
See application file for complete search history.

(56) References Cited

U.S. PATENT DOCUMENTS
7,153,017 B2 12/2006 Yamashita et al.
2006/0187552 A1* 8/2006 Huang et al. .................. 359/619

FOREIGN PATENT DOCUMENTS
TW M305348 8/1995
* cited by examiner

*Primary Examiner* — Ricky L Mack
*Assistant Examiner* — James C Jones
(74) *Attorney, Agent, or Firm* — Muncy, Geissler, Olds & Lowe, PLLC (57) ABSTRACT

An optical sheet includes a transparent base, a plurality of first micro structures, and a plurality of second micro structures. The transparent base has a light-receiving surface and a light-exit surface. The first micro structures are disposed on the light-exit surface, and the second micro structures are disposed on the light-receiving surface. Each first micro structure includes a first planar surface and a curve surface. Each second micro structure includes a second planar surface formed on the light-receiving surface and a total reflection surface connected with the second planar surface. Each first micro structure forms a first orthogonal projection area on the light-receiving surface, each second micro structure forms a second orthogonal projection area on the light-receiving surface, the second planar surface is located within the first orthogonal projection area, and the entire area of the second planar surface is equal to the second orthogonal projection area.

18 Claims, 7 Drawing Sheets

OPTICAL SHEET

CROSS REFERENCE TO RELATED APPLICATION

This application claims priority of application No. 098101316 filed in Taiwan R.O.C on Jan. 15, 2009 under 35 U.S.C. §119; the entire contents of which are hereby incorporated by reference.

BACKGROUND OF THE INVENTION

1. Field of the Invention

The invention relates to an optical sheet.

2. Description of the Related Art

Figure 1:
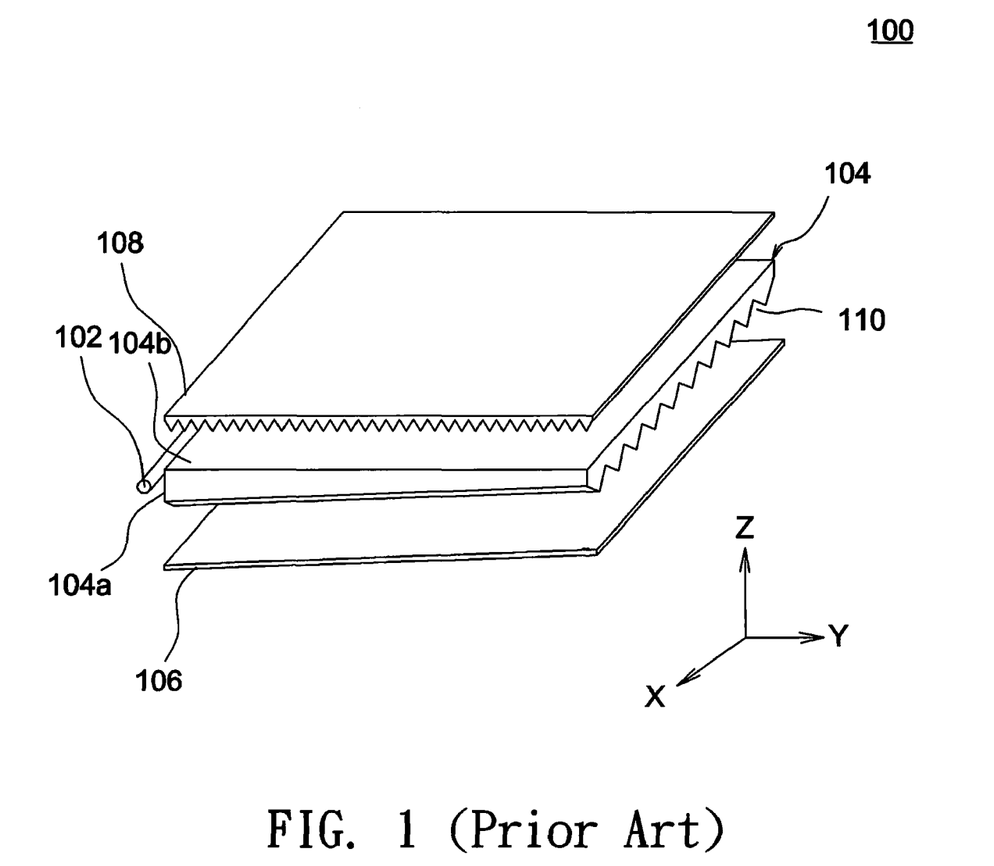
FIG. 1 shows a schematic diagram illustrating a conventional backlight module having a reverse prism sheet.

FIG. 1 shows a schematic diagram illustrating a conventional backlight module having a reverse prism sheet. Referring to FIG. 1, the backlight module 100 includes a light source 102, a light guide plate 104, a reflective sheet 106, and a reverse prism sheet 108. The light beams emitted by the light source 102 enter a side surface 104a of the light guide plate 104 and propagate in the light guide plate 104 through total reflection. When the light beams propagating in the light guide plate 104 strike rough surface structures (not shown) formed on a top surface 104b of the light guide plate 104, the total reflection condition is no longer met, and the light beams are allowed to pass through the top surface 104b of the light guide plate 104 and enter the reverse prism sheet 108. Finally, the incoming light beams are refracted through and reflected by the reverse prism sheet 108 to propagate in a direction parallel to a normal of the top surface 104b.

According to the conventional design, since the light guide plate 104 has a plurality of micro structures such as rough surface structures formed on the top surface 104b, the light beams exiting through the top surface 104b are often gathered up but not dispersed. Besides, since the reverse prism sheet 108 fails to narrow the light-emitting angle measured in X-Z plane, V-shape groves 110 formed underneath the light guide plate 104 are additionally needed to narrow the overall light-emitting angle measured in X-Z plane.

BRIEF SUMMARY OF THE INVENTION

The invention provides an optical sheet that is capable of homogenizing incoming light beams and has relatively narrow light-emitting angle.

In order to achieve one or part of or all the objectives or other objectives, an optical sheet is provided in an embodiment of the invention. The optical sheet includes a transparent base, a plurality of first micro structures, and a plurality of second micro structures. The transparent base has a light-receiving surface and a light-exit surface opposite the light-receiving surface. The first micro structures are disposed on the light-exit surface, and the second micro structures are disposed on the light-receiving surface. Each of the first micro structures includes a first planar surface formed on the light-exit surface and a curve surface opposite the first planar surface. Each of the second micro structures corresponds to one of the first micro structures and includes a second planar surface formed on the light-receiving surface and a total reflection surface connected with the second planar surface. Each of the first micro structures forms a first orthogonal projection area on the light-receiving surface, each of the second micro structures corresponding to the first micro structure forms a second orthogonal projection area on the light-receiving surface, the second planar surface is located within the first orthogonal projection area, and the entire area of the second planar surface is equal to the second orthogonal projection area.

In one embodiment, each of the first planar surfaces has a first side and a second side substantially perpendicular to each other, each of the second planar surfaces has a third side and a fourth side substantially perpendicular to each other, the third side is substantially parallel to the first side, and the length of the third side is equal to 20%-75% of the length of the first side.

In one embodiment, the second micro structures occupy 33%-60% of the entire area of the light-receiving surface.

In one embodiment, the first micro structures have a substantially identical first dimension and the second micro structures have a substantially identical second dimension.

In one embodiment, each of the first micro structures is a lenticular lens or a collimating lens.

In one embodiment, each of the second micro structures includes a prism, and the prism has a first side surface that serves as the second planar surface and a second side surface that adjoins the first side surface and serves as the total reflection surface.

In one embodiment, each of the second micro structures includes a triangular prism, and the triangular prism further includes a third side surface that adjoins the first side surface and serves as a total reflection surface.

In one embodiment, the first micro structures are arranged to form multiple rows, and each of the first micro structures in one row is staggered relative to a neighboring first micro structure in an immediately adjacent row.

In one embodiment, all the first micro structures in the same row are connected with one another.

In one embodiment, each two adjacent rows of first micro structures are connected with each other.

The embodiment or the embodiments of the invention may have at least one of the following advantages, according to the above embodiment, the light-emitting angles of the optical sheet measured in both planes that are perpendicular to each other are relatively narrowed. Also, incoming light rays with comparatively large incident angles are reflected on the planar area to provide light-mixing effect, thus reducing bright spots and improving luminous uniformity of a light guide plate. Further, the curvature of the curve surface of the lenticular lens may be varied to control the light-emitting angle of the optical sheet.

Other objectives, features and advantages of the present invention will be further understood from the further technological features disclosed by the embodiments of the present invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacently to" and variations thereof herein are used broadly and encompass directly and indirectly "adjacently to". Therefore, the description of "A" component facing "B" component herein may contain the situations that "A" component directly faces "B" component or one or more additional components are between "A" component and "B" component. Also, the description of "A" component "adjacently to" "B" component herein may contain the situations that "A" component is directly "adjacently to" "B" component or one or more additional components are between "A" component and "B" component. Accordingly, the drawings and descriptions will be regarded as illustrative in nature and not as restrictive.

Figure 2:
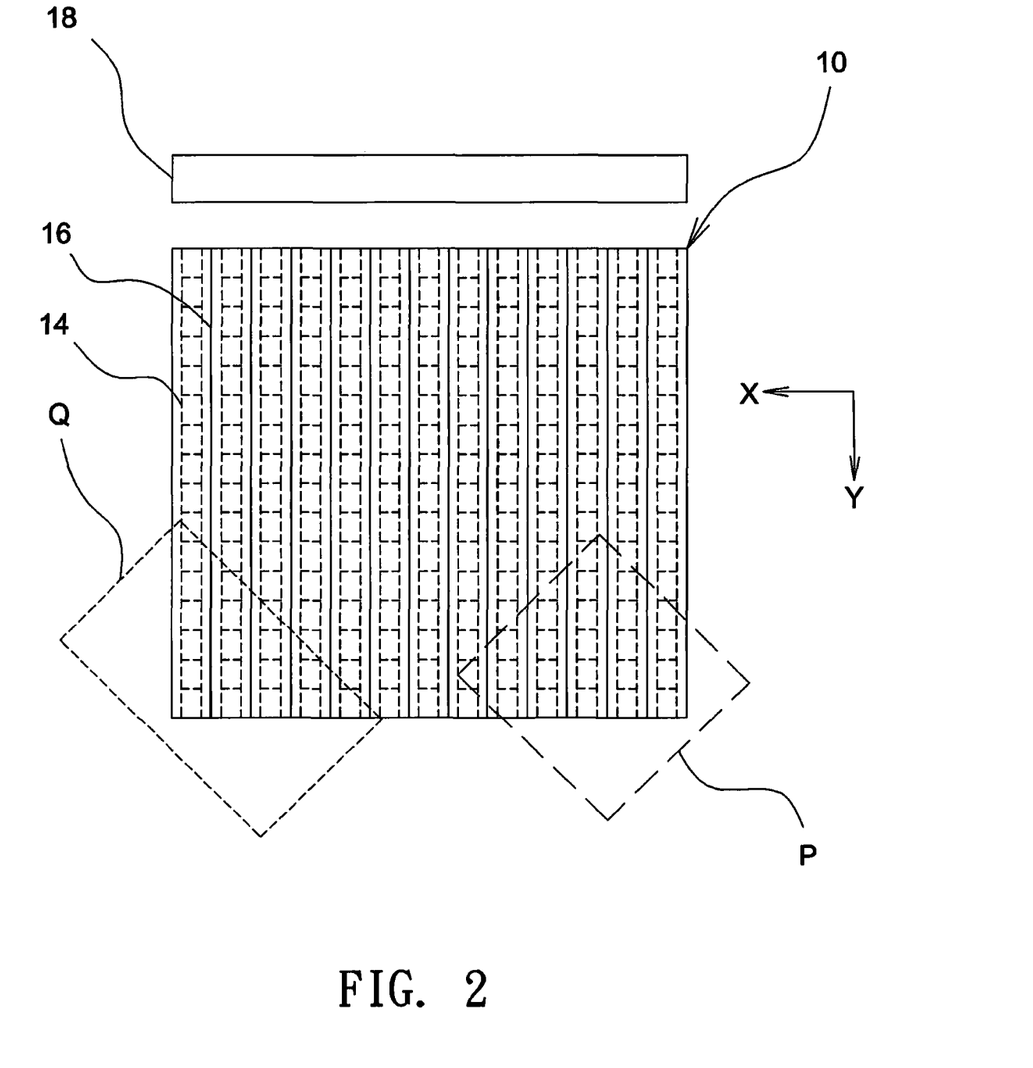
FIG. 2 shows a plane view of an optical sheet according to an embodiment of the invention.
Figure 3:
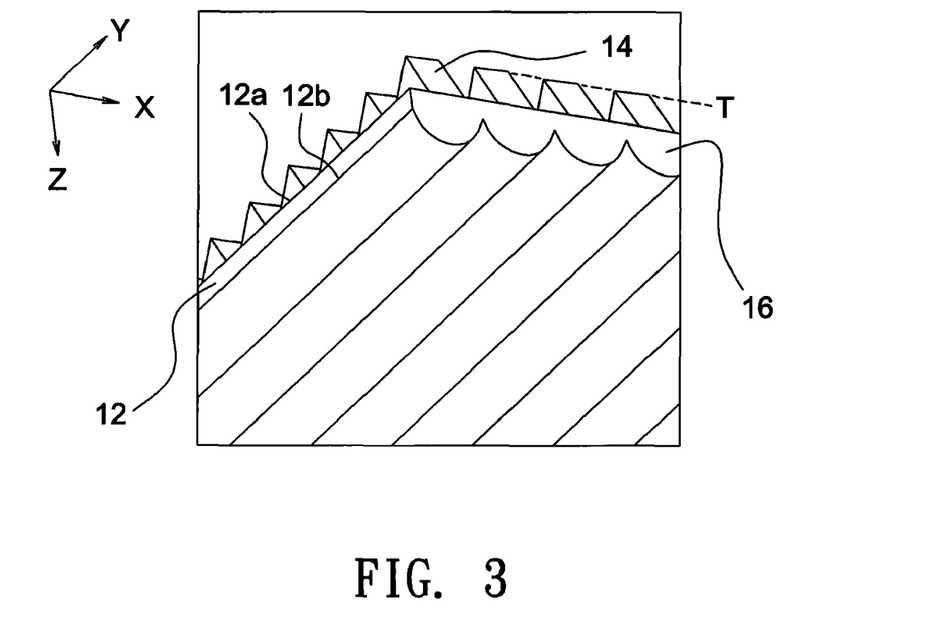
FIG. 3 shows a three-dimensional diagram illustrating a part of the optical sheet shown in FIG. 2.
Figure 4:
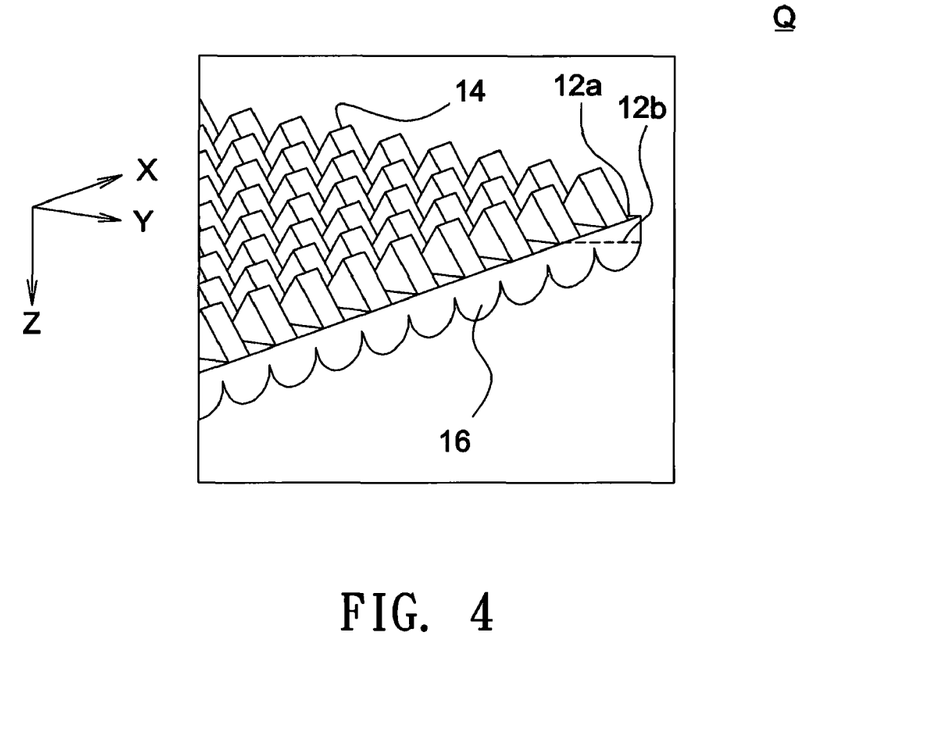
FIG. 4 shows a three-dimensional diagram illustrating another part of the optical sheet shown in FIG. 2.

FIG. 2 shows a plane view of an optical sheet 10 according to an embodiment of the invention. FIG. 3 shows a three-dimensional diagram illustrating a part P of the optical sheet 10 shown in FIG. 2. FIG. 4 shows a three-dimensional diagram illustrating another part Q of the optical sheet 10 shown in FIG. 2. Please refer to FIGS. 2 to 4, the optical sheet 10 includes a transparent base 12 and a plurality of micro structures formed on the transparent base 12. The transparent base 12 has a light-receiving surface 12a and a light-exit surface 12b opposite the light-receiving surface 12a. The micro structures may include a plurality of triangular prisms 14 formed on the light-receiving surface 12a and a plurality of lenticular lenses 16 formed on the light-exit surface 12b. The emitting light beams of the light source 18 first propagate in the light guide plate (not shown), and then the light beams enter the light-receiving surface 12a of the optical sheet 10 and leave the light-exit surface 12b of the optical sheet 10. A plurality of lenticular lenses 16 extending in the Y-axis direction are arranged on the light-exit surface 12b. A plurality of triangular prisms 14 are arranged on the light-receiving surface 12a to form a plurality of rows of prisms. In this embodiment, the length of one side of each lenticular lens 16 is substantially equal to the length of one side of the light-exit surface 12b, and each lenticular lens 16 overlaps one row of triangular prisms 14.

Figure 5:
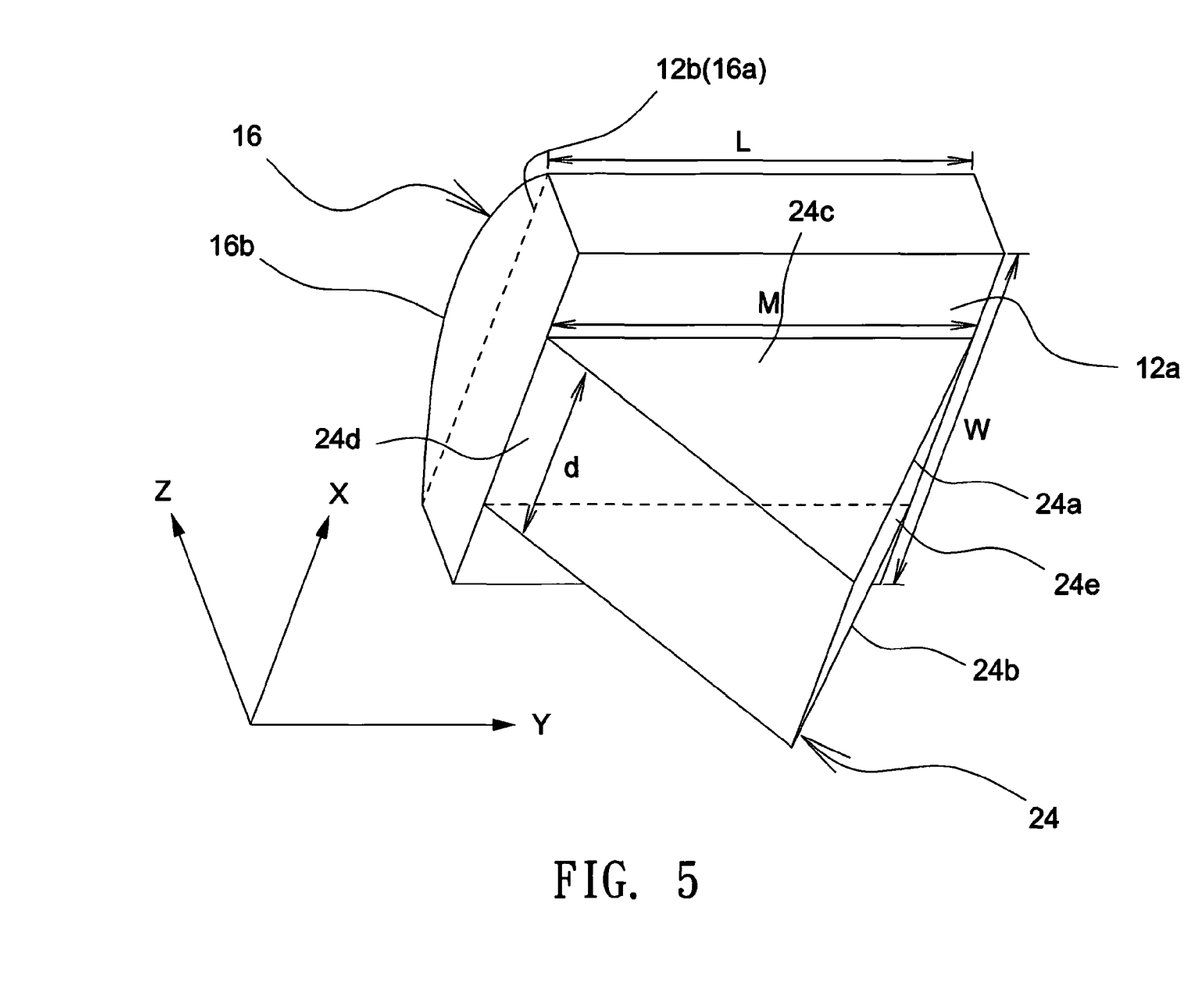
FIG. 5 shows a three-dimensional diagram illustrating the relative position of a triangular prism and a lenticular lens and their face configurations according to an embodiment of the invention.
Figure 6:
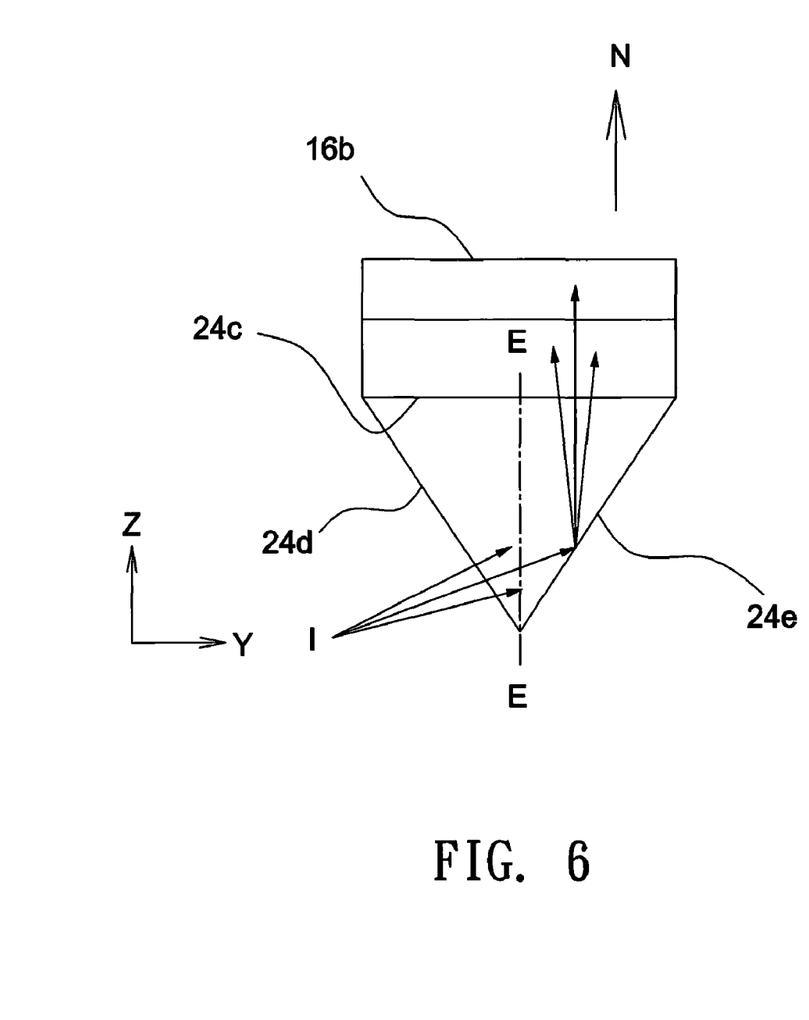
FIG. 6 and FIG. 7 show different side views of FIG. 5 depicted according to their respective viewing directions.
Figure 7:
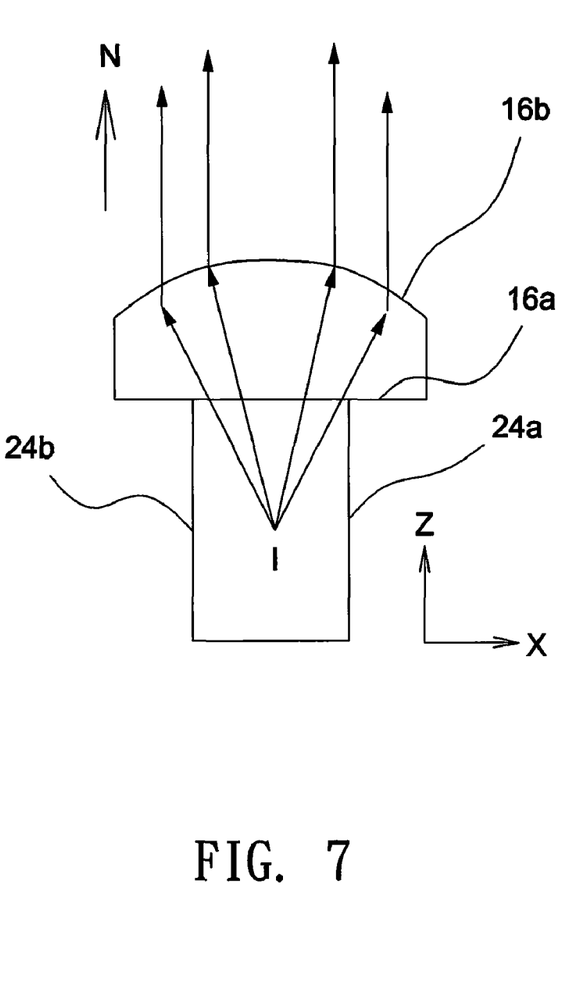

FIG. 5 shows a three-dimensional diagram illustrating the relative position of a triangular prism 24 and a lenticular lens 16 and their face configurations according to an embodiment of the invention. FIG. 6 and FIG. 7 show different side views of FIG. 5 depicted according to their respective viewing directions. Besides, propagation paths of light rays are depicted in FIG. 6 and FIG. 7 to illustrate the effect of the embodiment. Referring to FIG. 5, the triangular prism 24 includes two end surfaces 24a and 24b, and the end surfaces 24a and 24b are parallel to each other, and a first side surface 24c, a second side surface 24d, and a third side surface 24e are connected between the end surfaces 24a and 24b. The first side surface 24c is formed on the light-receiving surface 12a of the transparent base 12. The lenticular lens 16 may form a first orthogonal projection area on the light-receiving surface 12a, and the triangular prism 24 may form a second orthogonal projection area on the light-receiving surface 12a. In this embodiment, the first side surface 24c is located within the first orthogonal projection area, and the entire area of the first side surface 24c is smaller than the first orthogonal projection area and equal to the second orthogonal projection area. The second side surface 24d and the third side surface 24e connected with the first side surface 24c form an angle with each other, and both serve as total reflection surfaces. The lenticular lens 16 includes a rectangular plane 16a and a curve surface 16b. The rectangular plane 16a is formed on the light-exit surface 12b and the curve surface 16b is provided opposite the rectangular plane 16a. As shown in FIG. 6 and FIG. 7, the light beams I incident to the triangular prism 24 are totally reflected by the second side surface 24d or the third side surface 24e of the triangular prism 24 and then guided towards the curve surface 16b of the lenticular lens 16. Finally, the light beams I guided towards the curve surface 16b are deflected by the curve surface 16b to propagate in a direction substantially parallel to the normal N of the light-exit surface 12b. In one embodiment, a triangular prism 24 is taken as an example, the second side surface 24d and the third side surface 24e are respectively disposed on two sides of a central plane E of the triangular prism 24, with the central plane E dividing the triangular prism 24 into two equal parts. Hence, the second side surface 24d and the third side surface 24e are allowed to deflect light beams I incident thereon towards the central plane E; in other words, the light beams I are guided towards an immediately adjacent lenticular lens 16, and then the light beams I are deflected by the curve surface 16b of the lenticular lens 16 to propagate in a direction parallel to the normal N of the light-exit surface 12b. In another embodiment, the second side surface 24d and the third side surface 24e of the triangular prism 24 are not symmetrical. Also, in one embodiment, the curve surface 16b may be an irregular curve surface.

In one embodiment, since the triangular prism 14 under the lenticular lens 16 has one total reflection surface, the light-emitting angle of the optical sheet 10 measured in the Y-Z plane is narrowed as the light beams are deflected by the total reflection surface; in other words, the triangular prism 14 may function as a total-reflected optical aperture of its immediately adjacent lenticular lens 16 to collect light for the lenticular lens 16. Also, the light-focusing capability of the curve surface of the lenticular lens 16 is allowed to narrow the light-emitting angle of the optical sheet 10 measured in the X-Z plane. Hence, the light-emitting angles of the optical sheet 10 measured in both planes are perpendicular to each other are narrowed. In one embodiment, the optical sheet 10 may be provided in a light guide plate with simplified configuration (no V-shaped grooves are formed), or alternatively, the optical sheet 10 may be provided in a light guide plate having V-shape grooves and rough surface structures on a top surface of the light guide plate. Besides, in one embodiment, the triangular prisms 14 occupy 33%-60% of the entire area of the light-receiving surface 12a, and therefore 40%-67% of the entire area of the light-receiving surface 12a is a planar area and no micro structures are formed on the planar area. In that case, incoming light beams with comparatively large incident angles are reflected on the planar area to provide light-mixing effect, thus reducing hot spots and improving luminous uniformity of a light guide plate. Further, the curvature of the curve surface 16b of the lenticular lens 16 may be varied according to the actual demand to control the light-emitting angle of the optical sheet 10.

Figure 8:
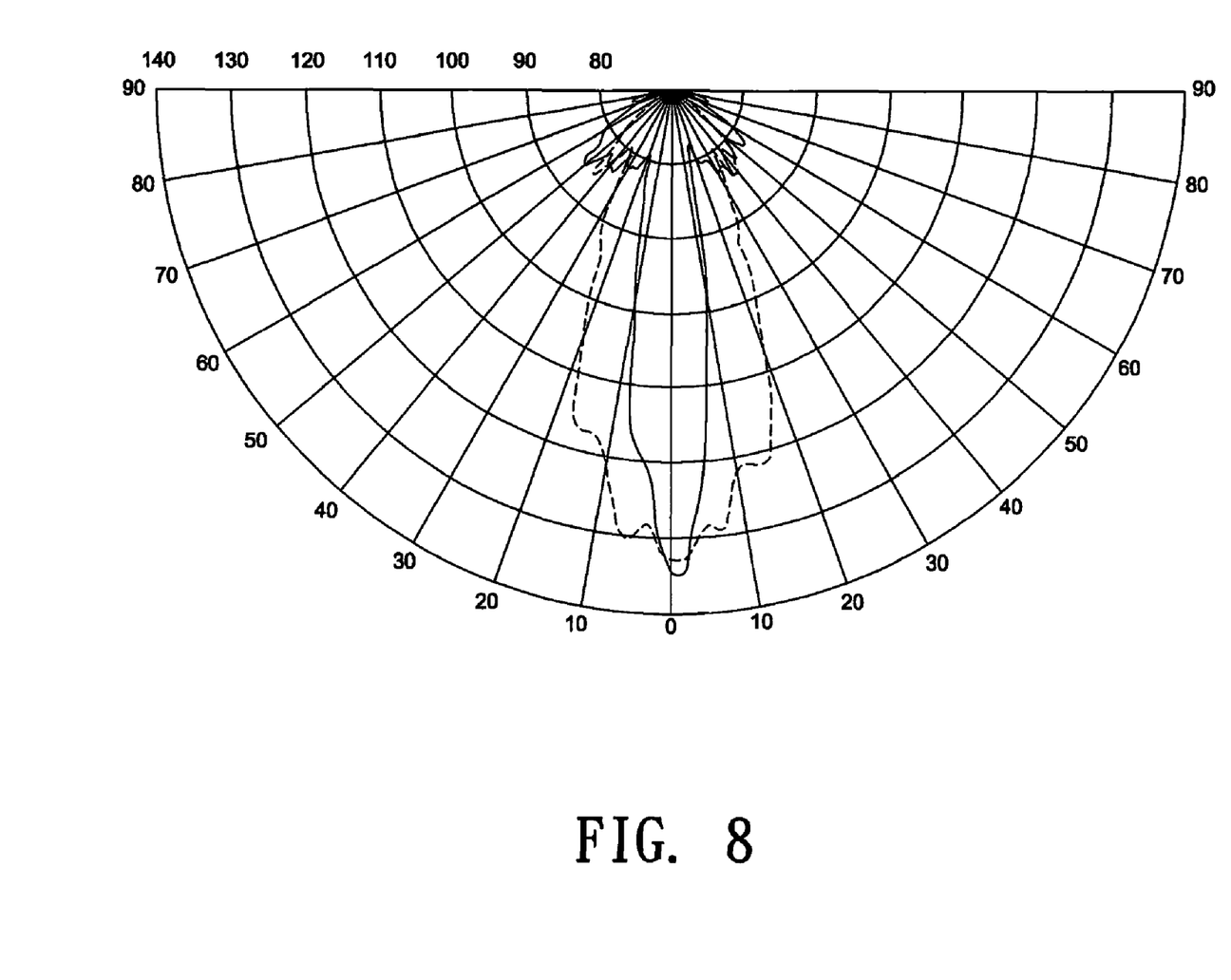
FIG. 8 shows a diagram illustrating simulation results of light-emitting angles of the optical sheet according to an embodiment of the invention.

As shown in FIG. 8, the light-emitting angles of the optical sheet 10 measured in the X-Z plane (indicated by dash lines) and the Y-Z plane (indicated by solid lines) are both well narrowed.

In the above embodiment, the triangular prisms 14 formed on the light-receiving surface 12a have an identical dimension, and the lenticular lenses 16 formed on the light-exit surface 12b also have an identical dimension. However, this is not limited. The micro structures formed on the light-receiving surface 12a or the light-exit surface 12b may have dimensions different from each other. Besides, as shown in FIG. 3, a ridge direction T of triangular prisms 14 (extending in the X-axis direction) is perpendicular to the extending direction (the Y-axis direction) of each lenticular lens 16. However, this is not limited, and the ridge direction T may be arbitrary selected. The light-emitting angle of the optical sheet 10 is narrowed in different planes depending upon the ridge direction T of the triangular prisms 14 but not limited to two planes perpendicular to each other. Further, two adjacent lenticular lenses are not limited to be connected with each other as shown in FIG. 3, and they may be spaced apart from each other for a small distance.

Figure 9:
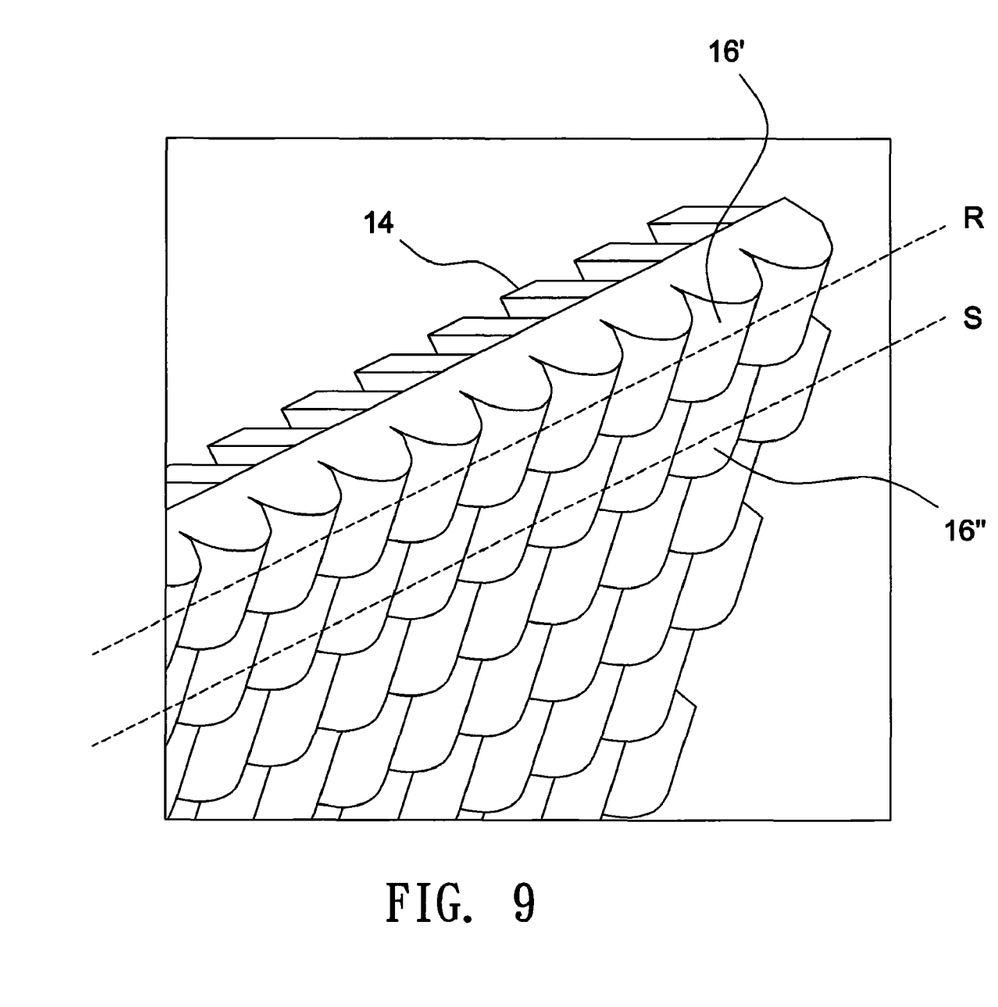
FIG. 9 shows a schematic diagram of an optical sheet according to another embodiment of the invention.

Referring to FIG. 9, the lenticular lenses 16 are arranged to form a plurality of rows (such as row R and row S), and a lenticular lens in one row are staggered relative to its neighboring lenticular lens in an immediately adjacent row. For example, as shown in FIG. 9, a lenticular lens 16' in the row R is staggered relative to its neighboring lenticular lens 16" in an immediately adjacent row S.

Please refer to FIG. 5 again, in one embodiment, the rectangular plane 16a of each lenticular lens 16 has a side L and a side W substantially perpendicular to the side L, and a corresponding triangular prism 14 overlapping the lenticular lens 16 also has a side M substantially parallel to the side L and a side d substantially perpendicular to the side M, and the length of the side d of the triangular prism 14 is equal to 20%-75% of the length of the side W of the lenticular lens 16. Hence, part of the light-receiving surface 12a is a planar area and no micro structures are formed on the planar area, and incoming light beams with comparatively large incident angles are reflected on the planar area to provide light-mixing effect, thus reducing hot spots and improving luminous uniformity of a light guide plate.

In the above embodiments, the micro structures on the transparent base 12 are exemplified as lenticular lenses and triangular prisms, but this is not limited. For example, the lenticular lenses may be replaced with collimating lenses or other structures having proper curve surfaces, and the triangular prisms may be replaced with prisms having another shape or other micro structures each having one total reflection surface.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical sheet, comprising:
   a transparent base having a light-receiving surface and a light-exit surface opposite the light-receiving surface;
   a plurality of first micro structures disposed on the light-exit surface, wherein each of the first micro structures comprises:
   a first planar surface formed on the light-exit surface, the first planar surface having a first side and a second side substantially perpendicular to each other; and
   a curve surface opposite the first planar surface; and
   a plurality of second micro structures disposed on the light-receiving surface, wherein each of the second micro structures corresponds to one of the first micro structures and comprises:
   a second planar surface formed on the light-receiving surface, the second planar surface having a third side and a fourth side substantially perpendicular to each other, the third side being substantially parallel to the first side, and the length of the third side being equal to 20%-75% of the length of the first side, wherein each of the first micro structures forms a first orthogonal projection area on the light-receiving surface, each of the second micro structures corresponding to the first micro structure forms a second orthogonal projection area on the light-receiving surface, the second planar surface is located within the first orthogonal projection area, and the entire area of the second planar surface is equal to the second orthogonal projection area; and a total reflection surface connected with the second planar surface.

2. The optical sheet as claimed in claim 1, wherein the second micro structures occupy 33%-60% of the entire area of the light-receiving surface.

3. The optical sheet as claimed in claim 1, wherein the first micro structures have a substantially identical first dimension and the second micro structures have a substantially identical second dimension.

4. The optical sheet as claimed in claim 1, wherein each of the second micro structures comprises a prism, and the prism has a first side surface that serves as the second planar surface and a second side surface that adjoins the first side surface and serves as the total reflection surface.

5. The optical sheet as claimed in claim 4, wherein each of the second micro structures comprises a triangular prism, and the triangular prism further comprises a third side surface that adjoins the first side surface and serves as a total reflection surface.

6. The optical sheet as claimed in claim 5, wherein the first micro structures are arranged to form multiple rows.

7. The optical sheet as claimed in claim 6, wherein each of the first micro structures in one row is staggered relative to a neighboring first micro structure in an immediately adjacent row.

8. The optical sheet as claimed in claim 7, wherein all the first micro structures in the same row are connected with one another.

9. The optical sheet as claimed in claim 6, wherein all the first micro structures in the same row are connected with one another.

10. The optical sheet as claimed in claim 9, wherein each of the first micro structures comprises a lenticular lens.

11. The optical sheet as claimed in claim 9, wherein each of the first micro structures comprises a collimating lens.

12. The optical sheet as claimed in claim 6, wherein each two adjacent rows of first micro structures are connected with each other.

13. The optical sheet as claimed in claim 12, wherein each of the first micro structures comprises a lenticular lens.

14. The optical sheet as claimed in claim 12, wherein each of the first micro structures comprises a collimating lens.

15. The optical sheet as claimed in claim 5, wherein each of the first micro structures comprises a lenticular lens.

16. The optical sheet as claimed in claim 5, wherein each of the first micro structures comprises a collimating lens.

17. The optical sheet as claimed in claim 1, wherein each of the first micro structures comprises a lenticular lens.

18. The optical sheet as claimed in claim 1, wherein each of the first micro structures comprises a collimating lens.

\* \* \* \* \*